(12) United States Patent
Takaada et al.

(10) Patent No.: US 12,379,054 B2
(45) Date of Patent: Aug. 5, 2025

(54) VACUUM PUMP AND CONNECTION PORT USED IN VACUUM PUMP

(71) Applicant: Edwards Japan Limited, Chiba (JP)

(72) Inventors: Tsutomu Takaada, Chiba (JP); Yongwei Shi, Chiba (JP)

(73) Assignee: Edwards Japan Limited, Chiba (JP)

( * ) Notice: Subject to any disclaimer, the term of this patent is extended or adjusted under 35 U.S.C. 154(b) by 466 days.

(21) Appl. No.: 17/426,130

(22) PCT Filed: Jan. 27, 2020

(86) PCT No.: PCT/JP2020/002746
§ 371 (c)(1),
(2) Date: Jul. 28, 2021

(87) PCT Pub. No.: WO2020/162249
PCT Pub. Date: Aug. 13, 2020

(65) Prior Publication Data
US 2022/0106961 A1    Apr. 7, 2022

(30) Foreign Application Priority Data
Feb. 4, 2019 (JP) .................................. 2019-018310

(51) Int. Cl.
*F16L 25/14* (2006.01)
*F16L 23/00* (2006.01)

(52) U.S. Cl.
CPC ............... *F16L 23/00* (2013.01); *F16L 25/14* (2013.01); *F05D 2250/14* (2013.01); *F05D 2250/141* (2013.01); *F05D 2250/52* (2013.01)

(58) Field of Classification Search
CPC ...................................................... F16L 25/14
See application file for complete search history.

(56) References Cited

U.S. PATENT DOCUMENTS

| 1,586,706 | A | * | 6/1926 | Russell | ................... | F16L 25/14 |
| | | | | | | 15/301 |
| 1,901,897 | A | * | 3/1933 | Clayton | ................... | F16L 25/14 |
| | | | | | | 285/179 |

(Continued)

FOREIGN PATENT DOCUMENTS

| CN | 104633330 A | * | 5/2015 | ............. F16L 25/14 |
| DE | 4127175 A1 | | 2/1993 | |

(Continued)

OTHER PUBLICATIONS

PCT International Search Report dated Mar. 31, 20 for corresponding PCT application Serial No. PCT/JP2020/002746, 2 pages.

(Continued)

*Primary Examiner* — Matthew Troutman
*Assistant Examiner* — Fannie Kee
(74) *Attorney, Agent, or Firm* — Theodore M. Magee; Westman, Champlin & Koehler, P.A.

(57) ABSTRACT

Provided are a vacuum pump which can be reduced in size without reducing exhaust performance, and a connection port which is used in the vacuum pump. The connection port which connects the vacuum pump and an auxiliary pump includes an oval first opening connectable to the vacuum pump and a circular second opening connectable to the auxiliary pump, and a diameter dimension of the first opening is set to be smaller than a diameter dimension of the second opening in an axial direction of the vacuum pump.

4 Claims, 3 Drawing Sheets

(56) References Cited

U.S. PATENT DOCUMENTS

| | | | | |
|---|---|---|---|---|
| 2,397,655 | A * | 4/1946 | Francis | F16L 25/14 |
| | | | | D23/266 |
| 2,509,782 | A * | 5/1950 | Person, Jr. | F16L 25/14 |
| | | | | 29/523 |
| 3,920,271 | A * | 11/1975 | Bluestone | F16L 25/14 |
| | | | | 285/183 |
| 4,159,899 | A * | 7/1979 | Deschenes | F16L 25/14 |
| | | | | 55/385.3 |
| 5,658,092 | A * | 8/1997 | Sweers | F16L 25/14 |
| | | | | 52/16 |
| 5,735,156 | A * | 4/1998 | Yoshitomi | F16L 25/14 |
| | | | | 72/58 |
| 6,196,597 | B1 * | 3/2001 | Karnes | F16L 25/14 |
| | | | | 285/331 |
| 6,203,297 | B1 | 3/2001 | Patel | |
| 7,007,981 | B2 * | 3/2006 | Yoshino | F16L 25/14 |
| | | | | 285/205 |
| 7,458,532 | B2 * | 12/2008 | Sloan | F16L 25/14 |
| | | | | 239/592 |
| 8,251,302 | B2 * | 8/2012 | Sloan, Jr. | F16L 25/14 |
| | | | | 239/592 |
| 8,689,837 | B1 * | 4/2014 | Smith | F16L 25/14 |
| | | | | 285/179 |
| 9,551,442 | B2 * | 1/2017 | Kim | F16L 25/14 |
| 9,874,223 | B2 * | 1/2018 | Theratil | F04D 29/403 |
| 9,903,256 | B2 * | 2/2018 | Sakai | F16L 25/14 |
| 2007/0267012 | A1 * | 11/2007 | McCarthy | F16L 25/14 |
| | | | | 128/201.27 |
| 2008/0092975 | A1 * | 4/2008 | Grimes | F16L 25/14 |
| | | | | 285/179 |
| 2012/0125465 | A1 * | 5/2012 | Bell | F16L 25/14 |
| | | | | 138/37 |
| 2014/0049040 | A1 * | 2/2014 | Jefferson | F16L 25/14 |
| | | | | 29/897.3 |
| 2015/0060691 | A1 | 3/2015 | Borichevsky | |
| 2016/0273552 | A1 | 9/2016 | Tsubokawa | |
| 2018/0320801 | A1 * | 11/2018 | Yang | F16L 25/14 |

FOREIGN PATENT DOCUMENTS

| | | | | |
|---|---|---|---|---|
| EP | 0307522 | A1 * | 3/1989 | F16L 25/14 |
| GB | 2047341 | A | 11/1980 | |
| JP | H11193793 | A | 7/1999 | |
| JP | 2000274394 | A | 10/2000 | |
| JP | 2002081320 | A | 3/2002 | |
| JP | 2004150788 | A | 5/2004 | |
| JP | 2011241932 | A | 12/2011 | |
| JP | 2012188982 | A | 10/2012 | |
| JP | 2016176339 | A | 10/2016 | |
| JP | 2018035718 | A | 3/2018 | |

OTHER PUBLICATIONS

PCT International Written Opinion dated Mar. 31, 20 for corresponding PCT application Serial No. PCT/JP2020/002746, 4 pages.
European Communication dated Oct. 10, 22 for corresponding European application Serial No. 20752447.1, 8 pages.

* cited by examiner

VACUUM PUMP AND CONNECTION PORT USED IN VACUUM PUMP

CROSS-REFERENCE OF RELATED APPLICATION

This application is a Section 371 National Stage Application of International Application No. PCT/JP2020/002746, filed Jan. 27, 2020, which is incorporated by reference in its entirety and published as WO 2020/162249A1 on Aug. 13, 2020 and which claims priority of Japanese Application No. 2019-018310, filed Feb. 4, 2019.

BACKGROUND OF THE INVENTION

The present invention relates to a vacuum pump and a connection port used in a vacuum pump.

In manufacture of a semiconductor device such as a memory or an integrated circuit, processing of forming a film such as an insulating film, a metal film, or a semiconductor film and processing including etching are performed in a process chamber in a high vacuum state in order to avoid an influence caused by dust or the like in the air. In order to exhaust air from the process chamber, a vacuum pump such as a turbo-molecular pump is used.

As such a vacuum pump, there is known a vacuum pump in which a turbo-molecular mechanism having rotor blades and stator blades which are arranged alternately in tiers in a longitudinal direction is disposed in a casing having an inlet into which gas is sucked from the outside and an outlet from which the sucked gas is exhausted to the outside.

Japanese Patent Application Publication No. 2018-35718 discloses a vacuum pump 1 which is configured such that gas introduced via an inlet 4 is transferred downward in a longitudinal direction by a gas transfer mechanism and compressed gas is exhausted to the outside from an outlet 6. Note that reference numerals are those described in Japanese Patent Application Publication No. 2018-35718.

The discussion above is merely provided for general background information and is not intended to be used as an aid in determining the scope of the claimed subject matter. The claimed subject matter is not limited to implementations that solve any or all disadvantages noted in the background.

SUMMARY OF THE INVENTION

However, the above-described vacuum pump has a problem in which the outlet formed into a substantially cylindrical shape occupies relatively large space and the vacuum pump cannot be reduced in size in the longitudinal direction.

To cope with the above problem, it is conceivable to reduce a diameter of the outlet to create extra space. However, when the diameter of the outlet is simply reduced, the gas cannot be exhausted smoothly, and exhaust performance of the vacuum pump is reduced.

Consequently, there arises a technical problem to be solved in order to reduce the size of the vacuum pump without reducing the exhaust performance, and an object of the present invention is to solve this problem.

In order to attain the above object, a vacuum pump of the present invention is a vacuum pump which sucks or exhausts gas between connected external equipment and the vacuum pump, wherein a connection port which connects the external equipment and the vacuum pump includes a non-circular first opening connectable to the vacuum pump and a circular second opening connectable to the external equipment, and a diameter dimension of the first opening is set to be smaller than a diameter dimension of the second opening in a direction perpendicular to a flow direction of the gas.

According to this configuration, as compared with a conventional vacuum pump which uses a cylindrical connection port, a side of the first opening of the connection port can be formed to be small while the exhaust performance of the vacuum pump is maintained, and it is possible to reduce the size of the vacuum pump.

In addition, in order to attain the above object, in the vacuum pump of the present invention, an area of an opening cross section of the connection port perpendicular to the flow direction of the gas is preferably set to be substantially constant from the first opening to the second opening.

According to this configuration, as compared with the conventional vacuum pump which uses the cylindrical connection port, the side of the first opening of the connection port can be formed to be small while the exhaust performance of the vacuum pump is maintained, and it is possible to reduce the size of the vacuum pump.

Further, in the vacuum pump of the present invention, the first opening is preferably formed into an oval shape, and a minor axis of the first opening is preferably set so as to substantially match an axial direction of the vacuum pump.

According to this configuration, the side of the first opening of the connection port can be formed to be small in the axial direction, and it is possible to reduce the size of the vacuum pump in the axial direction.

In addition, in the vacuum pump of the present invention, the connection port preferably includes a heater mounting portion into which a heater for heating the connection port is insertable.

According to this configuration, the heater can raise a temperature of the connection port to prevent a gas product from being deposited in the connection port.

Further, in the vacuum pump of the present invention, the heater mounting portion is preferably a hole formed into a tubular shape, and the heater mounting portion is preferably provided such that a longitudinal direction of the heater mounting portion matches a major axis of the first opening.

According to this configuration, the heater is mounted so as to traverse the connection port, and hence the temperature of the connection port is efficiently raised, and it is possible to further prevent the gas product from being deposited in the connection port.

In addition, in the vacuum pump of the present invention, the connection port is preferably formed of an aluminum alloy.

According to this configuration, by forming the connection port with the aluminum alloy excellent in heat conductivity, the temperature of the connection port is efficiently raised, and it is possible to further prevent the gas product from being deposited in the connection port.

Further, in order to attain the above object, a connection port of the present invention is a connection port which connects a vacuum pump and external equipment and allows gas to flow inside the connection port, the connection port including: a non-circular first opening connectable to the vacuum pump; and a circular second opening connectable to the external equipment, wherein a diameter dimension of the first opening is set to be smaller than a diameter dimension of the second opening in a direction perpendicular to a flow direction of the gas.

According to this configuration, as compared with the conventional vacuum pump which uses the cylindrical connection port, the side of the first opening of the connection port can be formed to be small while the exhaust performance of the vacuum pump is maintained, and it is possible to reduce the size of the vacuum pump.

According to the vacuum pump of the invention, as compared with the conventional vacuum pump which uses the cylindrical connection port, the side of the first opening of the connection port can be formed to be small while the exhaust performance of the vacuum pump is maintained, and it is possible to reduce the size of the vacuum pump.

In addition, according to the connection port of the invention, as compared with the conventional vacuum pump which uses the cylindrical connection port, the side of the first opening of the connection port can be formed to be small while the exhaust performance of the vacuum pump is maintained, and it is possible to reduce the size of the vacuum pump.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

An embodiment of the present invention will be described based on the drawings. In the following description, when referring to the number of elements (inclusive of a numerical value, an amount, a range or the like), the number of elements is not limited to a specific number unless otherwise explicitly stated or except the case where the number is apparently limited to the specific number in principle, and the number not less than or not more than the specific number is also applicable.

In addition, when referring to shapes of elements or positional relationships between the elements, they include substantially approximate or similar shapes or positional relationships unless otherwise explicitly stated or except the case where it is obviously not the case in principle.

Further, there are cases where the drawings are exaggerated by enlarging feature portions in order to facilitate understanding of features, and dimensional ratios of elements or the like are not necessarily identical to actual dimensional ratios thereof. Furthermore, in cross-sectional views, there are cases where hatching of part of elements is omitted in order to facilitate understanding of sectional structures of the elements.

Figure 1:
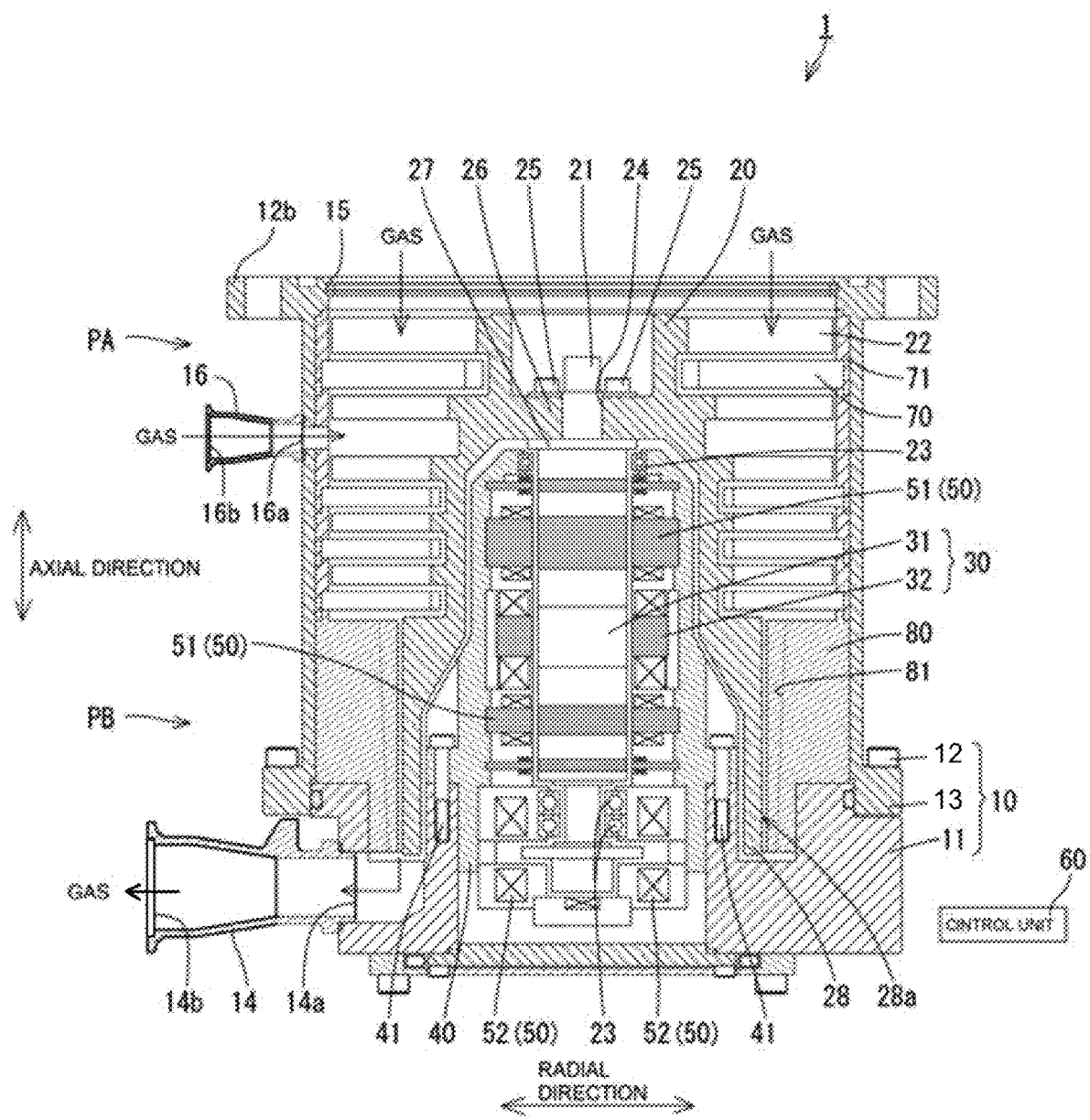
FIG. 1 is a longitudinal sectional view of a vacuum pump according to an embodiment of the present invention.

FIG. 1 is a longitudinal sectional view showing a vacuum pump 1. The vacuum pump 1 is a composite pump including a turbo-molecular pump mechanism PA and a thread groove pump mechanism PB which are accommodated in a substantially cylindrical casing 10.

The vacuum pump 1 includes the casing 10, a rotor 20 having a rotor shaft 21 which is rotatably supported in the casing 10, a motor 30 which rotationally drives the rotor shaft 21, and a stator column 40 which accommodates part of the rotor shaft 21 and the motor 30.

The casing 10 is constituted by a base 11, and a cylindrical portion 13 which is fixed via a bolt 12 in a state in which the cylindrical portion 13 is placed on the base 11.

An outlet port 14 which communicates with an auxiliary pump which is not shown is provided in a lower portion of the base 11 laterally with respect to the base 11.

At an upper end of the cylindrical portion 13, an inlet 15 connected to a vacuum container such as a chamber which is not shown is formed. In addition, on an outer periphery of the inlet 15, a flange 12b coupled to the vacuum container is formed. An inlet port 16 connected to the vacuum container is provided laterally with respect to the cylindrical portion 13. Note that, in the following description, the outlet port 14 and the inlet port 16 are collectively referred to as a "connection port".

The rotor 20 includes the rotor shaft 21, and a rotor blade 22 which is fixed to an upper portion of the rotor shaft 21 and is provided concentrically with respect to an axis of the rotor shaft 21.

The rotor shaft 21 is supported by a magnetic bearing 50 in a noncontact manner. The magnetic bearing 50 includes radial electromagnets 51 and axial electromagnets 52. The radial electromagnets 51 and the axial electromagnets 52 are connected to a control unit 60.

An upper portion and a lower portion of the rotor shaft 21 are inserted into touchdown bearings 23. In the case where the rotor shaft 21 becomes uncontrollable, the rotor shaft 21 which rotates at high speed comes into contact with the touchdown bearings 23 to prevent damage to the vacuum pump 1.

The rotor blade 22 is integrally mounted to the rotor shaft 21 by inserting bolts 25 into a rotor flange 26 and screwing the bolts 25 to a shaft flange 27 in a state in which the upper portion of the rotor shaft 21 is inserted into a boss hole 24.

The motor 30 is constituted by a rotator 31 mounted to an outer periphery of the rotor shaft 21, and a stator 32 disposed so as to surround the rotator 31. The stator 32 is connected to the control unit 60, and rotation of the rotor shaft 21 is controlled by the control unit 60.

A lower end portion of the stator column 40 is fixed to the base 11 via bolts 41 in a state in which the stator column 40 is placed on the base 11.

The control unit 60 controls excitation currents of the radial electromagnets 51 and the axial electromagnets 52 based on a detected value of a radial sensor (not shown) which detects a displacement of the rotor shaft 21 in a radial direction, and a detected value of an axial sensor (not shown) which detects a displacement of the rotor shaft 21 in an axial direction, and the rotor shaft 21 is thereby supported in a state in which the rotor shaft 21 is levitated at a predetermined position.

Next, a description will be given of the turbo-molecular pump mechanism PA disposed in a substantially upper half of the vacuum pump 1.

The turbo-molecular pump mechanism PA is constituted by the rotor blade 22, and a stator blade 70 which is disposed so as to be spaced from the rotor blade 22 in the axial direction. The rotor blades 22 and the stator blades 70 are arranged alternately in tiers along the axial direction and, in the present embodiment, the rotor blades 22 are arranged in five tiers and the stator blades 70 are arranged in four tiers.

The rotor blade 22 is constituted by a blade which is inclined by a predetermined angle, and is integrally formed on an outer peripheral surface of an upper portion of the rotor 20. In addition, a plurality of the rotor blades 22 are installed radially about an axis of the rotor 20.

The stator blade 70 is constituted by a blade which is inclined in a direction opposite to an inclination direction of the rotor blade 22, and the stator blade 70 is axially held between and positioned by spacers 71 which are installed on an inner wall surface of the cylindrical portion 13 so as to be stacked on each other. In addition, a plurality of the stator blades 70 are installed radially about the axis of the rotor 20.

The turbo-molecular pump mechanism PA described above transfers gas sucked from the inlet 15 and the inlet port 16 downward from above in the axial direction by rotation of the rotor blade 22.

Next, a description will be given of the thread groove pump mechanism PB which is disposed in a substantially lower half of the vacuum pump 1.

The thread groove pump mechanism PB includes a rotor cylindrical portion 28 which is provided in a lower portion of the rotor 20 and extends along the axial direction, and a substantially cylindrical stator 80 which is disposed so as to surround an outer peripheral surface 28a of the rotor cylindrical portion 28.

The stator 80 is placed on the base 11. The stator 80 includes a thread groove portion 81 which is engraved on an inner peripheral surface of the stator 80.

The thread groove pump mechanism PB described above compresses gas transferred downward in the axial direction from the inlet 15 and the inlet port 16 by a drag effect caused by high-speed rotation of the rotor cylindrical portion 28, and transfers the compressed gas toward the outlet port 14. Specifically, the gas is transferred to a gap between the rotor cylindrical portion 28 and the stator 80, and is then compressed in the thread groove portion 81 and transferred to the outlet port 14.

Figure 2:
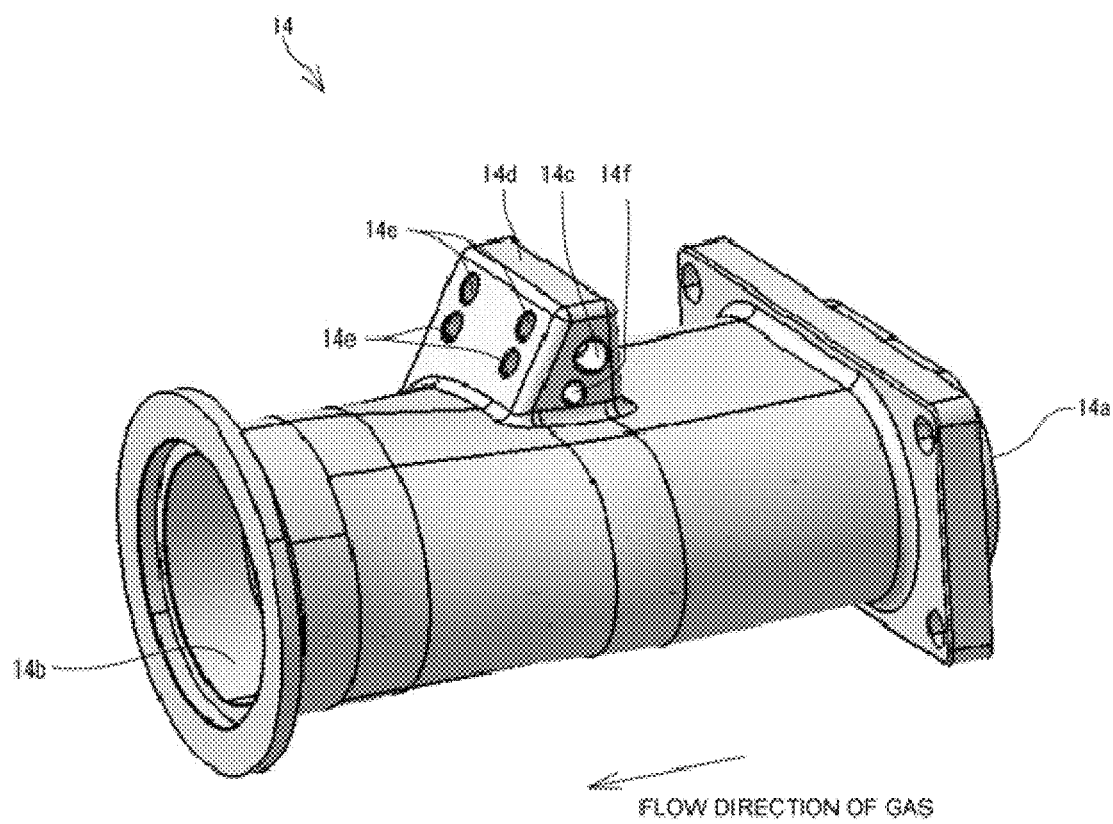
FIG. 2 is a perspective view showing an outlet port in FIG. 1.
Figure 3A:
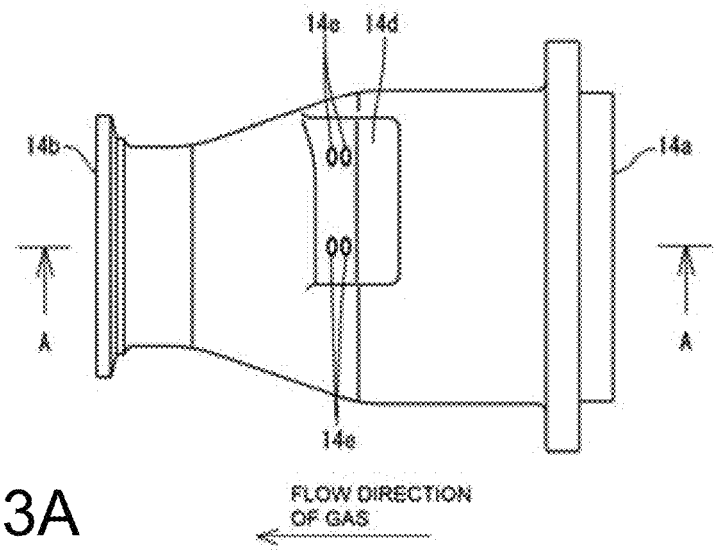
FIG. 3A is a plan view showing the outlet port.
Figure 3B:
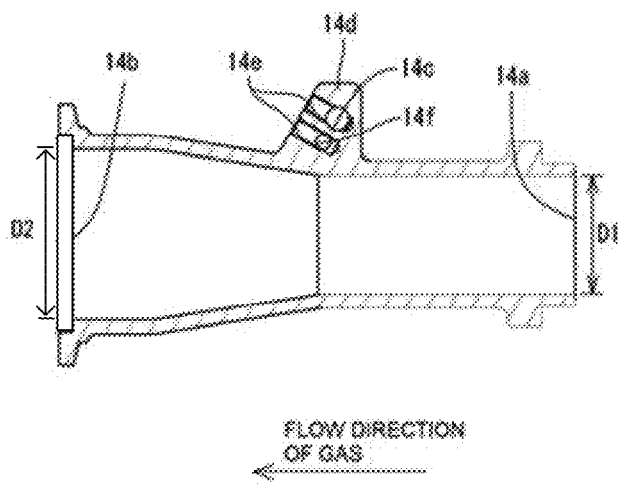
FIG. 3B is a longitudinal sectional view of the outlet port.
Figure 3C:
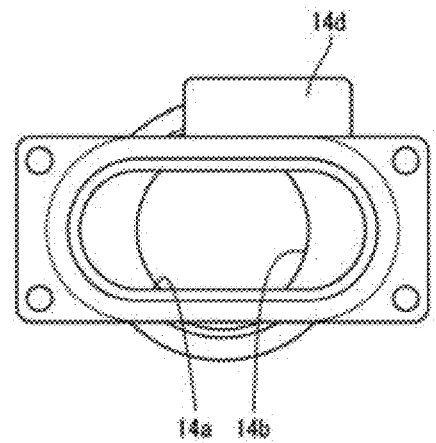
FIG. 3C is a side view of the outlet port when viewed from a side of a first opening.

Next, a configuration of the connection port will be described by using the outlet port 14 as an example based on FIGS. 2 and 3. FIG. 2 is a perspective view showing the outlet port 14. FIG. 3A is a plan view of the outlet port 14, FIG. 3B is a cross-sectional view taken along the line A-A of FIG. 3A, and FIG. 3C is a side view of the outlet port 14.

The outlet port 14 is formed into a tubular shape, and allows gas to flow inside the outlet port 14. The outlet port 14 is formed by casting with an aluminum alloy excellent in, e.g., heat conductivity. The outlet port 14 includes a first opening 14a which is connected to the base 11 and is formed into a non-circular shape, and a second opening 14b which is connected to the auxiliary pump and is formed into a circular shape. Note that there are cases where wording "the first opening 14a is connected to the base 11" is used to mean that the outlet port 14 is connected to the vacuum pump 1 for the convenience of description.

The first opening 14a is formed into an oblong shape in which a minor axis is set along the axial direction of the vacuum pump 1. Consequently, in the axial direction, a diameter dimension D1 of the first opening 14a is set to be smaller than a diameter dimension D2 of the second opening 14b. Note that a shape of the first opening 14a is not limited to the oblong shape shown in the drawing. For example, it is assumed that a circle having an opening area corresponding to an exhaust amount required of the first opening 14a is used, and the shape of the first opening 14a may be any shape such as an elliptical shape as long as the shape is an oval shape which is smaller than the circle in the axial direction. In addition, the shape of the first opening 14a is not limited to the oval shape, and may also be a rectangular shape or a diamond shape.

Figure 3D:
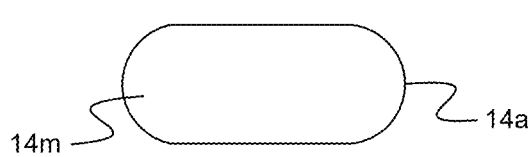
FIG. 3D is a view of the area of a cross section of the first opening perpendicular to the direction of gas flow.
Figure 3E:
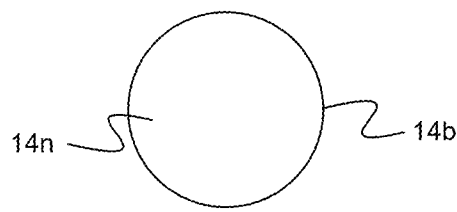
FIG. 3E is a view of the area of a cross section of the second opening perpendicular to the direction of gas flow.

An area of a cross section of the outlet port 14 perpendicular to an exhaust direction of gas moving from the first opening 14a toward the second opening 14b is set to be substantially constant from the non-circular first opening 14a to the circular second opening 14b such that the area of a cross section 14m of first opening 14a perpendicular to the flow direction of gas shown in FIG. 3D is substantially the same as the area of a cross section 14n of second opening 14b perpendicular to the flow direction of gas shown in FIG. 3E. With this, as compared with a conventional vacuum pump which uses a cylindrical outlet port, a side of the first opening 14a of the outlet port 14 can be formed to be small in the axial direction while exhaust performance of the vacuum pump 1 which uses the non-cylindrical outlet port 14 is maintained, and it is possible to reduce a size of the vacuum pump 1 in the axial direction. Note that the outlet port 14 may also be formed smoothly such that a vertical cross-sectional area of the outlet port 14 is gradually reduced or continuously increased along the exhaust direction of gas.

On an outer periphery of the outlet port 14, a heater mounting portion 14c is provided. Specifically, the heater mounting portion 14c is a tubular hole formed in a pedestal 14d which protrudes from the outer periphery of the outlet port 14, and is configured such that a bar-like sheathed heater which is not shown can be inserted into the heater mounting portion 14c.

The sheathed heater accommodated in the heater mounting portion 14c is fixed to the outlet port 14 by bolts (not shown) which are inserted into bolt holes 14e. The sheathed heater raises a temperature of the outlet port 14 to a proper temperature (e.g., 120° C.) to prevent a product of gas from being deposited in the outlet port 14.

The heater mounting portion 14c is disposed such that a longitudinal direction of the heater mounting portion 14c matches a major axis of the first opening 14a. With this, the sheathed heater is mounted so as to traverse the outlet port 14, and hence it is possible to efficiently raise the temperature of the outlet port 14.

Note that a reference numeral 14f in FIG. 2 denotes a sensor accommodation hole into which a temperature sensor which is not shown can be inserted. The temperature sensor is fixed to the outlet port 14 by bolts (not shown) inserted into the bolt holes 14e in a state in which the temperature sensor is accommodated in the sensor accommodation hole 14f. The temperature sensor sends a measured temperature of the outlet port 14 to the control unit 60, and the control unit 60 performs on-off control of the sheathed heater such that a preset temperature is maintained.

Next, a configuration of the inlet port 16 will be described. Note that the configuration of the inlet port 16 is substantially identical to the configuration of the outlet port 14, and a duplicate description thereof will be omitted.

A direction of flow of gas of the inlet port 16 is different from that of the outlet port 14 described above. That is, in the inlet port 16, a non-circular first opening 16a corresponding to the first opening 14a is connected to the casing 10, and a circular second opening 16b corresponding to the second opening 14b is connected to the vacuum container which is not shown. Note that there are cases where wording "the first opening 16a is connected to the casing 10" is used to mean that the inlet port 16 is connected to the vacuum pump 1 for the convenience of description.

In addition, the inlet port 16 is formed such that an area of a cross section perpendicular to a flow direction of gas which flows from the second opening 16b toward the first opening 16a is substantially constant along the flow direction of gas, i.e., from the circular second opening 16b to the non-circular first opening 16a. Note that the inlet port 16 may be smoothly formed such that a vertical cross-sectional area of the inlet port 16 is gradually reduced or continuously increased along the flow direction of gas.

The present invention can be variously modified without departing from the spirit of the present invention, and it should be understood that the present invention encompasses the modifications.

Note that the embodiment and modifications of the present invention may be combined on an as needed basis.

In addition, in the embodiment described above, the configuration of the vacuum pump 1 has been described by using, as an example, the vacuum pump including the inlet 15 and the inlet port 16, but the vacuum pump 1 may also be the vacuum pump including only one of the inlet 15 and the inlet port 16.

Further, the connection port is not limited to the connection port which connects the vacuum pump 1 and external equipment directly, and the connection port may also be the connection port which connects the vacuum pump 1 and external equipment via another piping or the like indirectly.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump which sucks or exhausts gas between connected external equipment and the vacuum pump, and the vacuum pump comprises a connection port which connects the external equipment and the vacuum pump, wherein
the connection port includes a non-circular first opening connectable to the vacuum pump, a circular second opening connectable to the external equipment, and a pedestal protruding from an outer periphery of the connection port, the pedestal comprising a tubular hole extending along an axis perpendicular to an axis of rotation of the vacuum pump wherein the tubular hole is configured to receive a heater for heating the connection port,
a diameter dimension of the first opening is set to be smaller than a diameter dimension of the second opening in a direction perpendicular to a flow direction of the gas,
the non-circular first opening is inserted into a non-circular hole of a casing of the vacuum pump, and
an area of a cross section of the non-circular first opening perpendicular to the flow direction of the gas is set to be substantially the same as an area of a cross section of the circular second opening.

2. The vacuum pump according to claim 1, wherein
the first opening is formed into an oval shape, and a minor axis of the first opening is set so as to substantially match the axis of rotation of the vacuum pump.

3. The vacuum pump according to claim 1, wherein the connection port is formed of an aluminum alloy.

4. A connection port which connects a vacuum pump and external equipment and allows gas to flow inside the connection port, the connection port comprising:
a non-circular first opening connectable to the vacuum pump;
a circular second opening connectable to the external equipment;
a pedestal protruding from an outer periphery of the connection port, the pedestal comprising a tubular hole extending along an axis that is configured to be perpendicular to an axis of rotation of the vacuum pump when the connection port is installed in the vacuum pump, the tubular hole configured to receive a heater for heating the connection port,
wherein a diameter dimension of the first opening is set to be smaller than a diameter dimension of the second opening in a direction perpendicular to a flow direction of the gas, and
the non-circular first opening is inserted into a non-circular hole of a casing of the vacuum pump,
wherein an area of a cross section of the non-circular first opening perpendicular to the flow direction of the gas is set to be substantially the same as an area of a cross section of the circular second opening perpendicular to the flow direction of the gas.

* * * * *